United States Patent [19]

Mikosch et al.

[11] Patent Number: 5,150,183
[45] Date of Patent: Sep. 22, 1992

[54] SWITCH MATRIX INCLUDING OPTICALLY NON-LINEAR ELEMENTS

[75] Inventors: Falk Mikosch, Graben-Neudorf, Fed. Rep. of Germany; Stanley D. Smith, Edinburgh, Great Britain

[73] Assignee: Kernforschungszentrum Karlsruhe GmbH, Karlsruhe, Fed. Rep. of Germany

[21] Appl. No.: 349,615

[22] Filed: May 10, 1989

[30] Foreign Application Priority Data

Jul. 10, 1987 [DE] Fed. Rep. of Germany ....... 3722881

[51] Int. Cl.⁵ ............................................ H01L 27/14
[52] U.S. Cl. ........................................ 357/32; 357/30; 357/55; 359/245; 359/248; 385/16; 385/17
[58] Field of Search ................. 357/32, 30 B, 30 D, 357/30 E, 30 H, 30 R, 55, 61, 68; 350/353, 354, 355, 356, 386, 96.13; 307/117; 359/240, 245, 248, 276; 385/16, 17

[56] References Cited

U.S. PATENT DOCUMENTS

| | | | |
|---|---|---|---|
| 3,691,389 | 9/1972 | Ellis et al. ........................ | 357/30 H |
| 3,718,511 | 2/1973 | Moulin .............................. | 357/30 B |
| 3,930,161 | 12/1975 | Ameurlaine et al. ............ | 357/30 D |
| 3,955,082 | 5/1976 | Dyment ............................ | 357/30 D |
| 4,093,345 | 6/1978 | Logan et al. ..................... | 350/355 |
| 4,198,116 | 4/1980 | Papuchon ......................... | 350/355 |
| 4,903,101 | 2/1990 | Maserjian ........................ | 357/30 E |
| 4,953,955 | 9/1990 | Maserjian ........................ | 350/354 |
| 5,002,369 | 3/1991 | Sakata .............................. | 350/354 |

FOREIGN PATENT DOCUMENTS

| | | | |
|---|---|---|---|
| 54-98587 | 3/1979 | Japan ............................. | 357/30 E |
| 1391910 | 4/1975 | United Kingdom ........... | 357/30 D |

OTHER PUBLICATIONS

Darling et al., "Solid State Storage Light Intensifier Panel", RCA TN No. 368, Jun. 13, 1960.
Lee et al., "Fabrication of Arrays of GaAs Optical Bistable Devices", App. Phys. Lett., 48(2), Jan. 13, 1986.
Flynn, "Total Active Area Silicon Photodiode Array", IEEE, Trans. on Elec. Dev., Oct. 1969.
Woodall, "Optical Communication Link", IBM Tech. Disc. Bull., vol. 12, No. 10, Mar. 1970.
H. M. Gibbs et al., "Proceedings of the Topical Meeting", Optical Bistability III, Dec. 2–4, 1985, Springer-Verlag, Berlin, Heidelberg, New York, Tokyo.
Applied Physics Ltr., Band 48, No. 2, Jan. 1986; (N.Y., US), T. Venkatesan et al.; "Fabrication of ...", Seiten, 145–147.

Primary Examiner—Rolf Hille
Assistant Examiner—Minhloan Tran
Attorney, Agent, or Firm—Spencer, Frank & Schneider

[57] ABSTRACT

A switch matrix which comprises non-linear optical (e.g. bistable) elements each consisting of an optically active layer applied to a substrate. The surface of the substrate has a microstructure composed of pillars each of which functions as a switch element and has at least one optically active layer. The pillar structure prevents interaction due to thermal contact and diffusion of charge carriers across the optically active layer and the substrate. The lithographic-galvanic (LIGA) process described is suited to the mass production of these structured substrates my moulding plastics. Both transparent and opaque substrates with high aspect ratios and adequate stability can be advantageously manufactured in this way.

12 Claims, 2 Drawing Sheets

SWITCH MATRIX INCLUDING OPTICALLY NON-LINEAR ELEMENTS

REFERENCE TO RELATED APPLICATION

This application is a continuation of copending Application PCT/DE88/00417 filed Jul. 7, 1988.

BACKGROUND OF THE INVENTION

The invention relates to a switch matrix composed of a plurality of optically non-linear, e.g., bistable, elements disposed as optically active layers on a common substrate surface to two methods of producing the switch matrix.

Optically non-linear elements may operate as light switches. Simplified, this process can be described as follows.

If the power of a laser beam which irradiates such an element is increased to beyond a certain threshold, a sudden rise in the transmitted light results and a sudden drop in the reflected light. This effect makes it possible to employ such optically non-linear components as switch elements for digital optical data processing. For this use, a two-dimensional arrangement of such switches is of particular interest — a switch matrix in which the individual switching elements have lateral dimensions in an order of magnitude of 10 $\mu m \times 10$ $\mu m$ and are positioned as closely together as possible.

Such a switch matrix is disclosed in "Optical Bistability III", published by Springer-Verlag, ISBN 3-540-16512-6, pages 39–41. This two-dimensional arrangement of switching elements was realized by means of MBE (molecular beam epitaxy). On a plate-shaped, 0.2 $\mu m$ thick substrate of $Al_{0.4}Ga_{0.6}As$, 0 4Ga0 6As, optically active GaAs layers of a size of $9 \times 9$ $\mu m^2$ and a thickness of 1.5 $\mu m$ are applied at a mutual spacing of 20 $\mu m$. Due to the mutual influence, the spaces between the elements cannot be reduced further. Moreover, the manufacturing process is complicated and expensive.

However, optically non-linear switching elements are known which can be produced by precipitating thin layers on a substrate without requiring epitaxial growth on the substrate. A typical example is the material ZnSe which is precipitated on a glass or sapphire substrate. In the past, it has not been attempted to spatially separate individual spots of such materials from one another on the substrate, rather various spots in the same layer are addressed in parallel by spatially limited laser light bundles. The definition of individual switching elements according to this process was thus effected by the spatial expanse of the laser light. Thermal contact and diffusion of charge carriers necessitate a spacing of the illuminated spots operating as switching elements in an order of magnitude of millimeters, instead, as desired, in an order of magnitude of microns, so as to limit cross-talk to permissible values. This solution is unsatisfactory because, due to the required relatively large distance between the individual switching elements, such a switch matrix can accommodate fewer switching elements by orders of magnitude than is desirable.

SUMMARY OF THE INVENTION

It is the object of the invention to make available an optical switch matrix having a very high packing density for its switching elements with low mutual influencing (cross-talk) as well as a method of producing the same.

This object is accomplished according to the invention by a switch matrix composed of a plurality of optically non-linear elements disposed as optically active layers on a common substrate surface wherein the substrate surface is a microstructure composed of a plurality of pillars with lateral spacings in a micron range, and the optically active layers of the respective devices are applied to respective frontal faces of free pillar ends in a cross-sectional region of the pillars.

The columnar structure of the substrate according to the invention and its high aspect ratio make it possible to place the individual switching elements in relatively close proximity to one another. This results in a large number and high packing density of the individual elements, with very good mutual decoupling. A structure having the desired very high aspect ratio is made possible by the mentioned LIGA [lithographic-galvanic] process which includes lithographic, galvanic and molding technology manufacturing steps.

The easiest way to produce such substrates resides in the use of plate-shaped X-ray resist material, e.g. PMMA (Plexiglas) which is structured in a brush shape by means of deep-etch X-ray lithography. The production of microstructured bodies according to the LIGA process is described and illustrated, inter alia, in KFK Bericht 3995 (KFK Report) by Kernforschungszentrum Karlsruhe (Nov. 1985). According to this publication, an X-ray radiation sensitive positive resist material, for example, is applied to a metal base plate, is partially irradiated, through a mask, with X-rays and developed so as to produce negative molds of plate-shaped microstructure bodies. The height of the negative mold corresponds to the layer thickness of the resist material; it may be up to 2 mm, depending on the penetration depth of the X-ray radiation. Thereafter, the negative mold is filled by electrodeposition with a metal, while employing the base plate as the electrode, whereupon the remaining resist material is removed by means of a solvent. Molding involves the use of a metal structure produced by deep-etch X-ray lithography and microgalvanic shaping for the repeated production of plastic molds which, in turn, can be filled, for example, by way of the electrodeposition of metals, whereupon the plastic is removed again.

With this technique it is possible to produce extremely accurate and fine structures having lateral dimensions in the micron range with a freely selectable height up to about 2 mm. With somewhat lower heights, it is even possible to realize minimum lateral dimensions in the submicron range.

This method is preferably suitable for the production of structured substrates for the precipitation of optically active layers which do not require epitaxy.

For optically active layers that must be produced by epitaxial growth, the use of crystals, e.g. Si, is proposed which obtained their columnar structure by anisotropic etching.

BRIEF DESCRIPTION OF THE DRAWINGS

The invention will now be described below with reference to an embodiment and of FIGS. 1 to 6. Wherein.

DETAILED DESCRIPTION OF THE PREFERRED EMBODIMENTS

Figure 1:
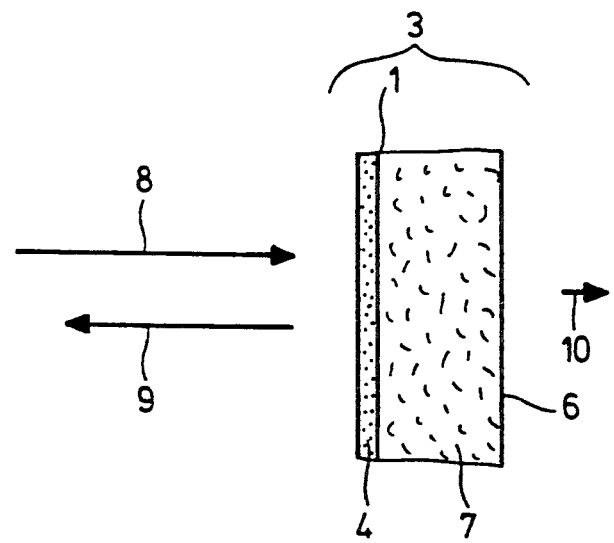
FIG. 1 illustrates the function principle of an optically non-linear switching element in the low transmission switching state.

FIG. 1 is a simplified illustration of the manner of operation of an optically non-linear switching element on a transparent substrate, with slight absorption losses being neglected. The length of the drawn arrows is intended to symbolize the intensity of the beams. In this case, switching element 3, is composed of a transparent substrate 7 onto whose front surface 1 an optically active layer 4 has been applied. The intensity of a holding beam 8 lies below a certain threshold at which the sudden change from a low transmission switching state to a high transmission switching state would take place. This results in a reflected beam 9 of the intensity of the holding beam 8 reduced by a loss component which leaves substrate 7 as a transmitted beam 10.

Figure 2:
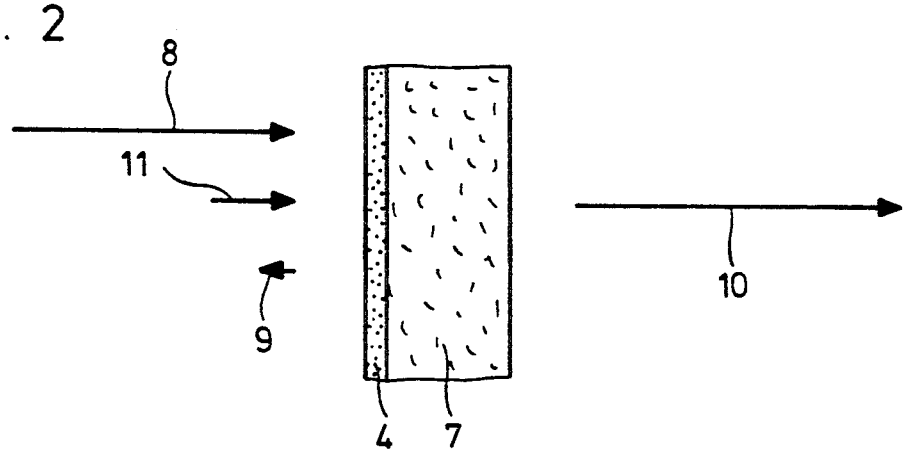
FIG. 2, illustrates the function principle of an optically non-linear switching element in the high transmission switching state.

According to FIG. 2, a relatively low intensity signal beam 11 now causes the threshold to be exceeded and causes a transition of the layer 4 to the high transmission switching state. The reflected beam 11 disappears except for an insignificant remainder and the intensities of holding beam 8 and signal beam 9 produce the intensity of transmitted beam 10.

Figure 3:
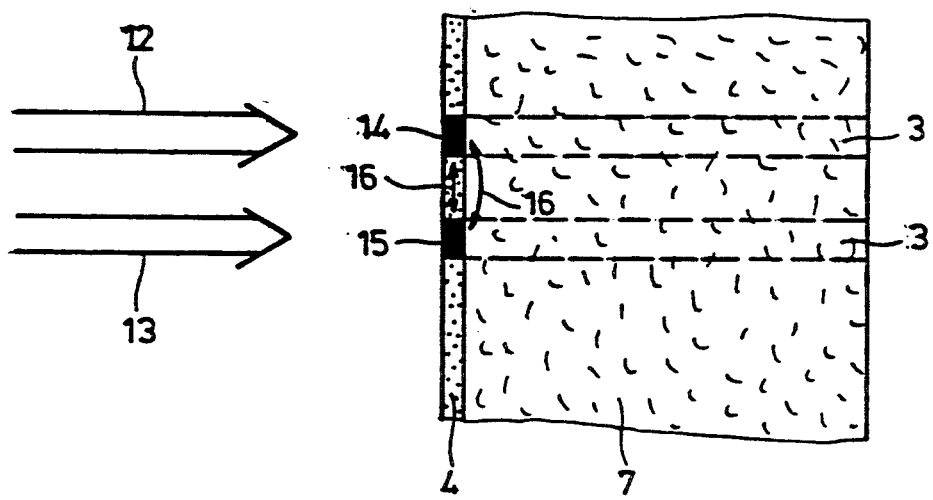
FIG. 3 is a schematic representation of the mutual influencing between two adjacent optical switching elements.

FIG. 3 is a cross-sectional view of a switch matrix which is defined by a first zone 14 of interaction with a first beam bundle 12 and a second zone 15 of interaction with a second beam bundle 13. The smallest possible distance between the two switching elements 3 is defined by their annoying interaction 16 due to thermal contact and the diffusion of charge carriers through optically active layer 4 and substrate 7. Therefore, thoughts have been directed toward spatially separating the individual switching elements, if they are spaced relatively closely laterally, by the introduction of troughs between them. Such troughs have not yet been fabricated for this purpose. The use of a diamond saw or a laser beam as cutting tool is contemplated. If such troughs are ever to become a reality, they will in any case have an aspect ratio of less than about 5, i.e. the depth of a trough will be greater at most by a factor of 5 than its width. For effective decoupling, deep troughs having a substantially higher aspect ratio are desirable. For the same reason, the use of dry etching processes known from the manufacture of microelectronic circuits is not appropriate for such structuring, insofar as the materials and substrates available for this purpose permit them at all.

Figure 4:
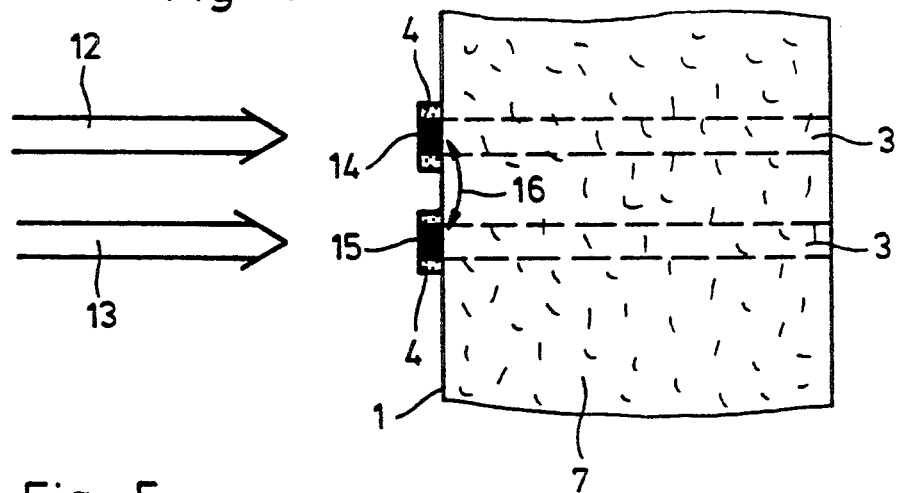
FIG. 4 is a schematic representation of a possible improvement by way of structuring the optically active layer.

FIG. 4 shows a possible improvement by structuring the optically active layer 4 so as to prevent at least the annoying interaction 16 from optically active layer 4.

Figure 5:
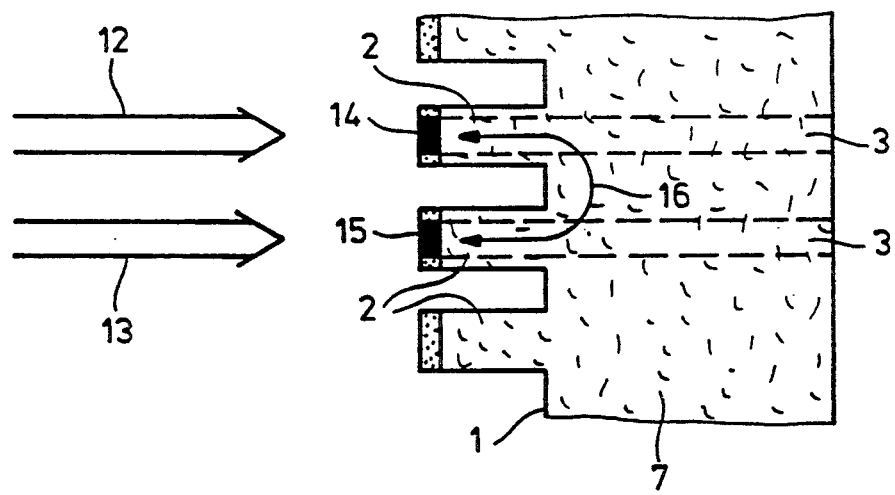
FIG. 5 illustrates the structuring of the substrate into pillars having a low aspect ratio.

FIG. 5 is a sectional view of the structuring according to the invention of substrate surface 1 in which pillars 2 reduce the annoying interaction 16 from substrate 7.

Figure 6:
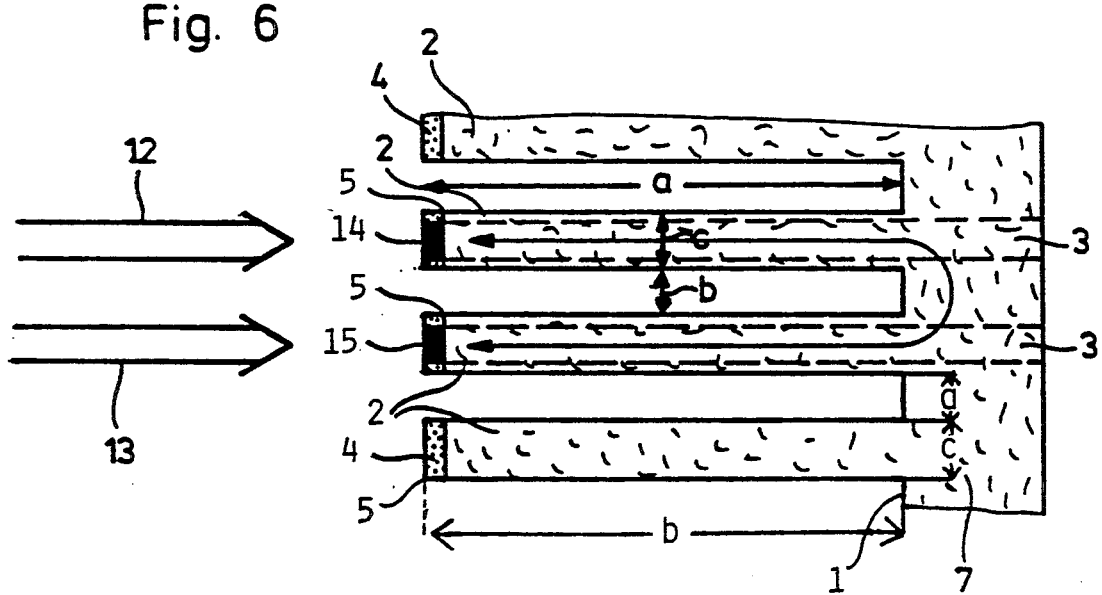
FIG. 6 illustrates the structuring of the substrate into pillars having a high aspect ratio.

Substantial decoupling of the two switching elements 3 is realized by structuring substrate surface 1 for a high aspect ratio as shown in FIG. 6. According to the LIGA process, it is possible to produce transparent and non-transparent substrates having aspect ratios of 100 and sufficient stability. Typical dimensions are: a=5 $\mu$m, b=500 $\mu$m and c=10 $\mu$m to 30 $\mu$m. The easiest way to produce such substrates is by employing an X-ray resist material, e.g. PMMA (Plexiglas) as the substrate material and deep-etch X-ray lithography. Precipitation of optically active layers 4 on the end faces 5 of pillars 2 causes individual switching elements 3 to be produced there which can be addressed separately from one another and in parallel by means of light beams. A partial lateral vapor-deposition on the pillars and on the bottom area between them does not interfere with the operation of these elements. If necessary, several possibilities exist for interrupting the deposition of layers between the pillars.

For the economical mass production of such substrates, the LIGA process permits the use of plastic molds. Thus other transparent substrate materials can also be employed. If it should become possible to perform sintering processes within LIGA structures, glasses and ceramics would also be suitable.

The use of transparent substrates for optical switching elements is necessary only if the transmitted light serves as the information carrier. For a series of uses under discussion, the reflected light is sufficient as the information carrier. In this case, the substrate need not be transparent and it is possible to employ the entire rear side of the substrate for temperature control purposes. Very suitable are brush-shaped metal structures, e.g. of Ni or Cu, produced by the LIGA process onto which may be applied, if necessary, a layer to electrically insulate the optical switching elements and to absorb the radiation transmitted by the switching elements.

We claim:

1. In a switch matrix composed of a plurality of optically non-linear elements disposed as optically active layers on a common substrate surface; the improvement wherein: the substrate surface is a microstructure composed of a plurality of pillars with lateral spacings in a micron range; and the optically active layers of the respective devices are applied to respective frontal faces of free pillar ends in a cross-sectional region of the pillars.

2. Switch matrix according to claim 1, wherein the substrate is transparent.

3. A switch matrix according to claim 2 wherein said substrate is formed of plexiglass.

4. Switch matrix according to claim 1, wherein the substrate is non-transparent.

5. A switch matrix according to claim 4 wherein said substrate is formed of a metal.

6. A switch matrix according to claim 5 wherein said metal is formed of at least one of Ni and Cu.

7. A switch matrix according to claim 1 wherein said pillars have a height which is a multiple of said lateral spacing and of the cross-sectional dimension of said pillars.

8. A switch matrix according to claim 7 wherein: said pillars have a height of approximately 500 $\mu$m and a cross-sectional dimension of approximately 10–30 $\mu$m, and said lateral spacing is approximately 5 $\mu$m.

9. A switch matrix according to claim 1 wherein said substrate is formed of a semiconductor material.

10. A switch matrix according to claim 1 wherein said switch elements are responsive to light to switch same between substantially transparent and opaque states.

11. A switch matrix according to claim 1 wherein the spaces between said pillars have an aspect ratio greater than 5.

12. A switch matrix according to claim 1 wherein said microstructure of spaced pillars has an aspect ratio greater than 5 and up to 100.

* * * * *

UNITED STATES PATENT AND TRADEMARK OFFICE
CERTIFICATE OF CORRECTION

PATENT NO. : 5,150,183
DATED : September 22, 1992
INVENTOR(S) : Falk Mikosch, et. al.

It is certified that error appears in the above-indentified patent and that said Letters Patent is hereby corrected as shown below:

On the Title page, item [63] insert -- Continuation of application PCT/DE88/00417, filed July 7, 1988--.

Signed and Sealed this

Nineteenth Day of October, 1993

Attest:

BRUCE LEHMAN

Attesting Officer     Commissioner of Patents and Trademarks